(12) United States Patent
Sato

(10) Patent No.: US 7,923,963 B2
(45) Date of Patent: Apr. 12, 2011

(54) CHARGING APPARATUS AND TERMINAL APPARATUS

(75) Inventor: Hidenobu Sato, Yokohama (JP)

(73) Assignee: Kyocera Corporation, Kyoto (JP)

( * ) Notice: Subject to any disclaimer, the term of this patent is extended or adjusted under 35 U.S.C. 154(b) by 99 days.

(21) Appl. No.: 11/535,344

(22) Filed: Sep. 26, 2006

(65) Prior Publication Data

US 2007/0069685 A1 Mar. 29, 2007

(30) Foreign Application Priority Data

Sep. 29, 2005 (JP) ................................. 2005-284497

(51) Int. Cl.
*H02J 7/00* (2006.01)
*H01M 10/44* (2006.01)
*H01M 10/46* (2006.01)

(52) U.S. Cl. ........ 320/101; 320/112; 320/113; 320/114; 320/115; 320/138; 320/125

(58) Field of Classification Search .................. 320/101, 320/112, 113, 114, 115, 116, 125, 128, 134, 320/135, 136, 138
See application file for complete search history.

(56) References Cited

U.S. PATENT DOCUMENTS

| | | | | |
|---|---|---|---|---|
| 4,016,566 | A | | 4/1977 | Fujiki |
| 4,266,178 | A | | 5/1981 | Asakawa |
| 5,936,380 | A | * | 8/1999 | Parrish ........................... 320/101 |
| 6,051,954 | A | * | 4/2000 | Nagao et al. ................... 320/101 |
| 6,084,379 | A | * | 7/2000 | Buniatyan ..................... 320/101 |
| 6,097,331 | A | | 8/2000 | Matsugatani et al. |
| 6,188,197 | B1 | | 2/2001 | Watanabe et al. |
| 6,376,764 | B1 | * | 4/2002 | Luo ................................ 136/244 |
| 6,586,906 | B1 | * | 7/2003 | Bessa et al. .................... 320/101 |
| 6,801,967 | B2 | | 10/2004 | Nakamura et al. |
| 6,847,834 | B1 | * | 1/2005 | Leem ........................... 455/572 |
| 6,949,909 | B2 | * | 9/2005 | Chuang ......................... 320/101 |
| 7,570,010 | B2 | * | 8/2009 | Benckenstein et al. ........ 320/101 |
| 2002/0061739 | A1 | | 5/2002 | Nakamura et al. |
| 2002/0079980 | A1 | | 6/2002 | Chabas |
| 2007/0222410 | A1 | * | 9/2007 | Lee ............................... 320/101 |

(Continued)

FOREIGN PATENT DOCUMENTS

DE 2558144 A1 7/1976

(Continued)

OTHER PUBLICATIONS

Kuroki, et al. "High-Speed ASK Transceiver Based on the NRD-Guide Technology at 60-GHz Band" IEEE Transactions on Microwave Theory and Techniques, vol. 46, No. 6, Jun. 1998, pp. 806-810.

(Continued)

*Primary Examiner* — Edward Tso
*Assistant Examiner* — Alexis Boateng
(74) *Attorney, Agent, or Firm* — DLA Piper LLP (US)

(57) ABSTRACT

In order to improve the charging efficiency of a charging apparatus including a photovoltaic generator such as a solar battery, a charging apparatus includes: a battery which is rechargeable; a photovoltaic generator generating electric power in response to received light; and a generative charging portion supplying the electric power generated by the photovolaic generator to the battery. The generative charging portion includes: a control portion which controls current in the direction from the battery to the photovoltaic generator; and a voltage regulation portion which regulates voltage of the electric power supplied from the photovoltaic generator to the battery and is connected to the control portion in series.

9 Claims, 3 Drawing Sheets

U.S. PATENT DOCUMENTS

2008/0084177 A1 * 4/2008 Sander et al. ............... 320/101

FOREIGN PATENT DOCUMENTS

| | | |
|---|---|---|
| EP | 1058367 A2 | 12/2000 |
| EP | 1324422 A2 | 7/2003 |
| JP | 58051603 A | 3/1983 |
| JP | 58111506 A | 7/1983 |
| JP | 61294769 A | 12/1986 |
| JP | 07162560 A | 6/1995 |
| JP | 08223067 A | 8/1996 |
| JP | 09322425 A | 12/1997 |
| JP | 2000069132 A | 3/2000 |
| JP | 2000156516 A | 6/2000 |
| JP | 2001037100 A | 2/2001 |
| JP | 2001127686 A | 5/2001 |
| JP | 2002157085 A | 5/2002 |
| JP | 2002238182 A | 8/2002 |
| JP | 2003-229946 | 8/2003 |
| JP | 2004023879 A | 1/2004 |
| JP | 2004-140521 | 5/2004 |
| JP | 2004222225 A | 8/2004 |
| JP | 2005190295 A | 7/2005 |

OTHER PUBLICATIONS

German language office action and its English language translation for corresponding German Application No. 10 2005 034 878.5-35 lists the references above.

Japanese language office action and its English language translation for corresponding Japanese application 2005284497 lists the references above.

Japanese language office action and its English language office action for corresponding Japanese application 2005274497 lists the references above.

Japanese language office action and its English language office action for corresponding Japanese application 2005284497 lists the references above.

* cited by examiner

CHARGING APPARATUS AND TERMINAL APPARATUS

BACKGROUND OF THE INVENTION

1. Field of the Invention

The present invention relates to a charging apparatus and a terminal apparatus.

Priority is claimed on Japanese Patent Application No. 2005-284497, filed Sep. 29, 2005, the content of which is incorporated herein by reference.

2. Description of Related Art

In recent years, there have been proposals to make charging apparatuses which charge a battery by using a solar battery which includes a solar panel which converts received light to electrical power, and a solar charging circuit which supplies the electrical power generated by the solar panel to the battery, For example, there is a proposal in which a charging apparatus is used to charge a battery of a cellular phone (see Japanese Unexamined Patent Application, First Publication No. 2004-140521).

On the other hand, even today, the amount of electrical power generated by a solar panel per unit area included in the solar battery is small. Therefore, generally, by setting the charging apparatus externally and by providing the solar panel at a different constitution element from the main body of a cellular phone, a method of preparing sufficient area for setting the solar panel is applied (see Japanese Unexamined Patent Application, First Publication No. 2003-229946).

However, in the case in which the constitution element on which the solar panel is provided is different from the main body of the cellular phone, naturally, it is necessary to carry about a charging apparatus that the solar panel is attached to the constitution element different from the cellular phone with the cellular phone, which is troublesome. Therefore, it is preferable to apply a structure in which the solar panel is attached to the main body of the cellular phone, that is, the solar battery is included in the cellular phone. In such case, it is not possible to obtain a sufficient area for attaching the solar panel and to generate a sufficient amount of electrical power, therefore, it could take a few days (for example, 10 days) to fully charge a battery of the cellular phone and efficiency is significantly worse than using a conventional battery.

SUMMARY OF THE INVENTION

The present invention is made with respect to the problem above and has an object to increase the charging efficiency of the charging apparatus which uses an electric power generator which generates electric power in response to received light, like a solar battery.

In order to achieve the object above, a charging apparatus of the present invention includes: a battery which is rechargeable; an electric power generator which generates electric power in response to received light; and a generative charging circuit which supplies electric power generated by the electric power generator to the battery, generative charging circuit including: a control portion which controls current in the direction from the battery to the electric power generator; and a voltage regulation portion which regulates voltage of electric power supplied from the electric power generator to the battery, and which is connected with the control portion in series.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

FIGS. 1-4 show one embodiment of the present invention and the embodiment explained below shows a case in which the present invention is applied to a terminal apparatus such as a cellular phone.

Figure 1:
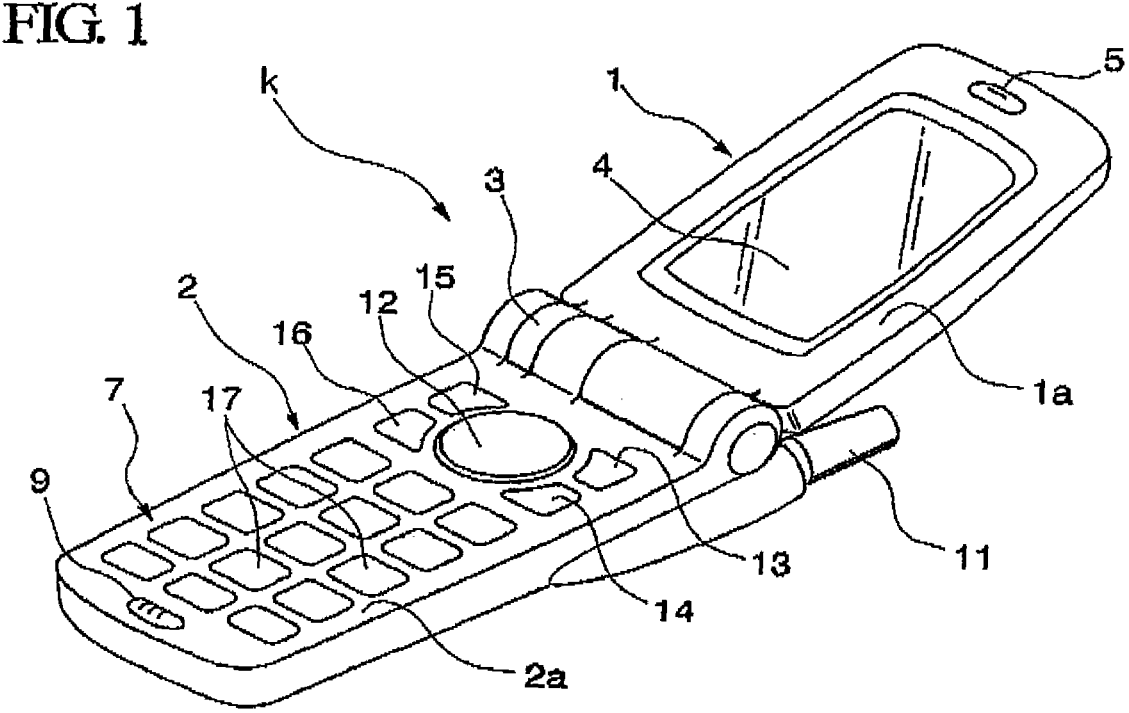
FIG. 1 is a cellular phone of one embodiment of the present invention where the inner faces are seen from an oblique direction.
Figure 2:
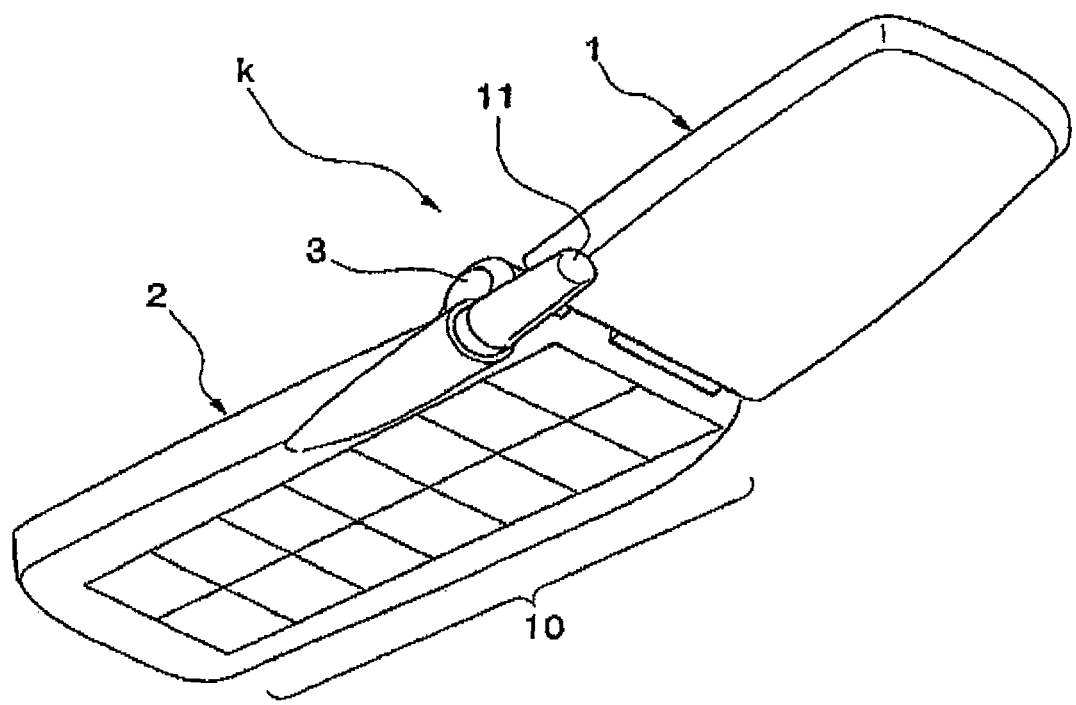
FIG. 2 is a cellular phone of one embodiment of the present invention where outer faces are seen from an oblique direction.

FIGS. 1 and 2 are figures of a cellular phone K of this embodiment seen from oblique directions, FIG. 1 is a figure of a cellular phone K of this embodiment seen in an oblique direction from above, and FIG. 2 is a figure of a cellular phone K of this embodiment seen in an oblique direction from below.

As shown in these figures, the cellular phone K of this embodiment has two cases including a first case 1 and a second case 2. These two cases 1 and 2 are connected via a hinge portion 3 and are foldable, therefore, they are constituted to be open and closed. On a facing surface 1a of the first case 1 which is facing the second case 2 when the two cases 1 and 2 are folded, a display portion 4 and a speaker portion 5 are provided. On a facing surface 2a of the second case 2 which is facing the first case 1 when two cases are folded, a key operation portion 7 and a microphone 9 are provided. Moreover, close to the hinge portion 3 of the second case 2, an antenna 11 is provided for communication with a base station. This antenna 11 can be retracted into the second case 2 and can be pulled out of the second case 2. On the key operation portion 7, there are keys such as: a multiple function operation key 12 which has a four direction key, a decision key and the like; an operation key 13 for an operation guide; an operation key 14 for a mail; an operation key 15 for Web browsing; an operation key 16 for a telephone book; and operation keys 17 including numeric keypads such as 0-9, *, #, and the like.

Figure 3:
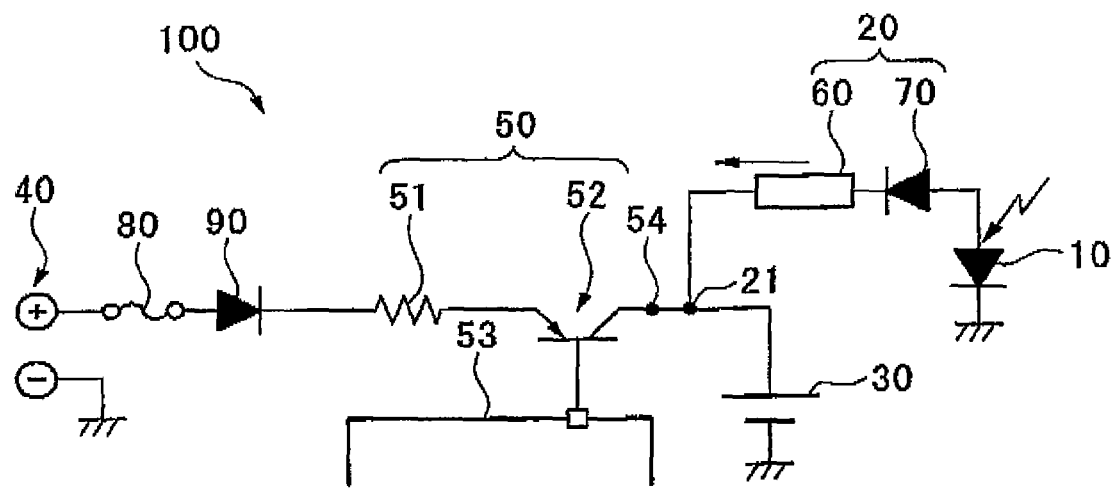
FIG. 3 is a circuit diagram of a charging apparatus included in a cellular phone of one embodiment of the present invention.

The cellular phone K of this embodiment has a charging apparatus 100, such as shown in FIG. 3, to which the photovoltaic generation is applied, and a solar panel 10, as a photovoltaic generator, which is one of its elements, is set on a back face 2b, which is a surface portion, of the second case 2 as shown in FIG. 2.

FIG. 3 is a circuit diagram of the charging apparatus 100. As shown in this figure, the charging apparatus 100 is constituted by providing: the solar panel 10 which generates electric power in response to received light, in other words, the solar panel 10 is a photovoltaic generator that converts the energy of light to electrical energy and generates electric power; a solar charging circuit 20 which is used as a generative charging circuit; a battery 30 which is rechargeable; an AC adaptor input terminal 40 to which an exteral power source such as a commercial power source is connected; and an external charging circuit 50 which converts and outputs the electrical power from the external power source connected to the AC adaptor input terminal 40.

With respect to the charging apparatus 100, the solar panel 10 and the AC adaptor input terminal 40 are attached and exposed on the outside of the cases 1 and 2, and other constitution elements are set inside the first case 1 or the second case 2.

The solar panel 10 generates electric power in response to received light by converting the energy of light to electric energy, and is attached to the outside of the back face 2b of the second case 2 as described above. It should be noted that, with respect to a generally used cellular phone, an approximately 4 cm×7 cm area can be obtained for setting the solar panel 10.

The solar charging circuit 20 supplies electric power generated through the power generation of the solar panel 10 to the battery 30. In this embodiment, as shown in FIG. 3, the solar charging circuit 20 has a constitution in which a regulator 60 as a voltage regulation portion and a reverse-current blocking diode 70 as a control portion are connected in series.

The regulator 60 regulates the voltage of the electric power supplied from the solar panel 10 to the battery 30.

Figure 4:
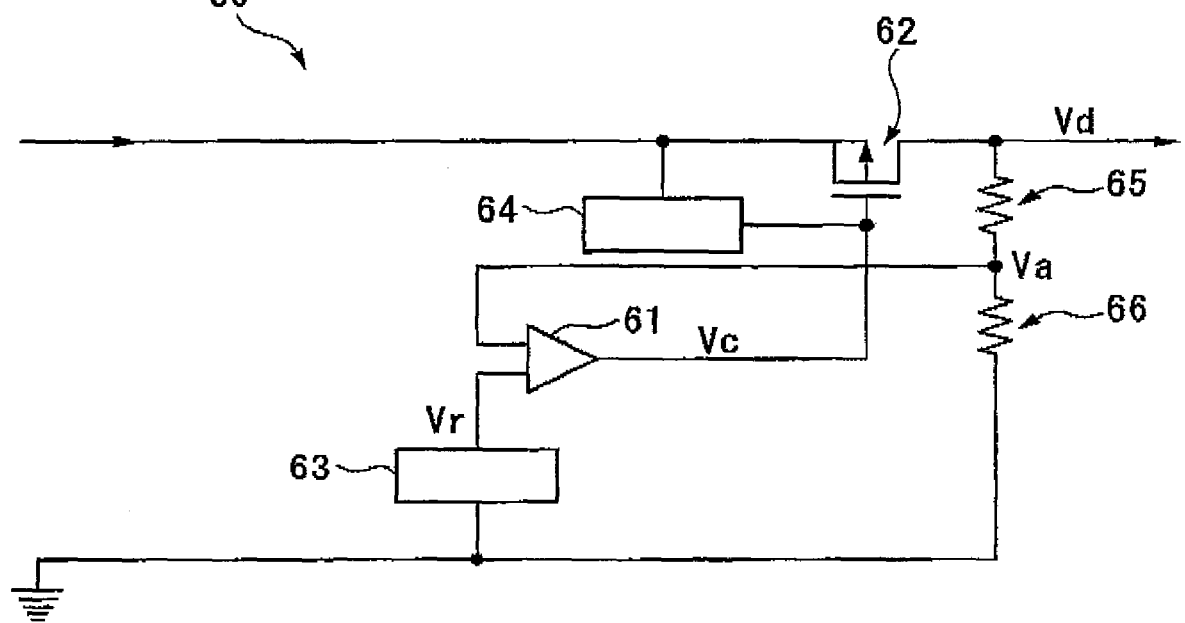
FIG. 4 is a circuit diagram showing an example of a regulator.

FIG. 4 is a circuit diagram showing a concrete example of the regulator 60. As shown in this figure, the regulator 60 is constituted by providing an operational amplifier 61, a control transistor 62, a reference voltage circuit 63, and an overcurrent protection circuit 64. A voltage Va is obtained by operating a resistance voltage division on an output voltage from a drain of the control transistor 62 by using two resistances 65 and 66, a reference voltage Vr is determined by the reference voltage circuit 63, and in the regulator 60, a gate voltage Vc is determined by comparing the voltage Va and the reference voltage Vr. As a result, an output voltage Vd from the drain of the control transistor 62 is regulated to be the same as the reference voltage Vr. When an overcurrent is applied to the regulator 60, the overcurrent is prevented from reaching the battery 30 by the overcurrent protection circuit 64.

Back to FIG. 3, the reverse-current blocking diode 70 prevents the current flowing in the direction from the battery 30 to the solar panel 10.

The battery 30 stores the supplied electric power, outputs the electric power for the operation of the cellular phone K in accordance with requirements, and can be, for example, a lithium-ion battery or the like.

The external charging circuit 50 supplies the electric power which is supplied from an AC adaptor via the AC adaptor input terminal 40. In other words, the external charging circuit 50 supplies the electric power, which is output after converting from the AC electric power supplied from the external power source via the AC adaptor input terminal 40 to the DC electric power by the AC adaptor, which is not shown in the figures, to the battery 30. The external charging circuit 50 is constituted by providing a charged-current detection resistance 51, a charging transistor 52, and an electric power IC 53.

It should be noted that, with respect to the cellular phone K of this embodiment, an output portion 21 of the solar charging circuit 20 is connected closer to the battery 30 than an output portion 54 of the external charging circuit 50.

Between the AC adaptor input terminal 40 and the external charging circuit 50, both a fuse 80, which cuts the connection when an overcurrent or an overvoltage is applied, and a reverse-current blocking diode 90, which prevents a current flowing in the direction from the external charging circuit 50 to the AC adaptor input terminal 40, are provided.

It should be noted that it is constituted in a manner in which, when both the solar charging circuit 20 and the external charging circuit 50 are operating, the one which is supplying an electric power of a higher voltage has a higher priority, and supplies the electric power to the battery 30.

In other words, in the case in which the electric power is supplied from the external power source via the external charging circuit 50 while the electric power generated by the solar panel 10 is supplied via the solar charging circuit 20 to the battery 30, and the voltage of the electric power supplied from the external power source is larger than the voltage of the electric power generated by the solar panel 10, the electric power is supplied from the external charging circuit 50 to the battery 30.

Conversely, if the voltage of the electric power generated by the solar panel 10 is larger than the voltage of the electric power supplied from the external power source, the electric power is supplied from the solar charging circuit 20 to the battery 30.

With respect to the cellular phone K of this embodiment which is constituted in the manner above, when the light is irradiated on the solar panel 10, the electric power is generated by the solar panel 10. The electric power generated by this solar panel 10 changes in accordance with the illuminance of the light irradiated on the solar panel 10, and continuously changes.

The electric power which changes continuously is regulated by the regulator 60 and supplied to the battery 30. As a result, the battery 30 is charged.

It should be noted that as described above, in the case in which the external power source is connected while the electric power generated by the solar panel 10 is supplied via the solar charging circuit 20 to the battery 30, and the voltage of the electric power generated by the solar panel 10 is larger than the voltage of the electric power supplied from the external power source, the electric power is not supplied from the external charging circuit 50 to the battery 30.

In accordance with the charging apparatus 100 provided in the cellular phone K of this embodiment, it is not necessary to supply the electric power generated by the solar panel 10 to the battery 30 via the external charging circuit for supplying the electric power from the external power source to the battery as in a conventional charging apparatus. Therefore, it is possible to design the solar charging circuit 20 as a dedicated circuit for supplying the electric power generated by the solar panel 10. That is, it is possible to design the solar charging circuit 20 which is suitable for a small amount of generated power. Hence, by applying the charging apparatus 100 of this embodiment, it is possible to improve the charging efficiency of the charging apparatus which uses the photovoltaic generator such as the solar battery.

Concretely, as shown in FIG. 4, a voltage regulation portion of the solar charging circuit 20 is constituted from the regulator 60 including the operational amplifier 61, and the regulator 60 does not include a charging transistor which is provided by the external charging circuit 50, therefore, it is possible to reduce the electric power consumed by the solar charging circuit 20.

It should be noted that the external charging circuit 50 is constituted based on the assumption that there is a charging apparatus to which sufficient electric power is supplied from an external power source, therefore, by applying such a constitution, a larger amount of electric power is consumed than in the solar charging circuit 20. However, with respect to the charging apparatus of this embodiment, a structure in which the electric power from the solar panel 10 is supplied to the battery 30 via the external charging circuit 50 is not applied.

Therefore, it is possible to prevent the electric power which is supplied from the solar panel 10 to the battery 30 from being consumed by the external charging circuit 20 when electric power is supplied from the solar panel 10 to the battery 30. Hence, it is possible to improve the charging efficiency of the charging apparatus which uses the photovoltaic generator.

With respect to the cellular phone K of this embodiment providing the charging apparatus 100 above, it is possible to use the electric power generated by the solar panel 10 efficiently for charging and to charge the battery 30 in a shorter time.

With respect to the cellular phone K of this embodiment, when the light irradiated on the solar panel 10 is weak, there can be a case in which the electric potential of the solar panel 10 decreases and is lower than the electric potential of the battery 30. However, with respect to the charging apparatus 100 included in the cellular phone K of this embodiment, the solar charging circuit 20 has a constitution in which both the reverse-current blocking diode 70, which prevents a current flowing in the direction from the battery 30 to the solar panel 10, and the regulator 60, which regulates voltage of the electric power supplied in the direction from the solar panel 10 to the battery 30, are connected in series. Therefore, a leakage of electric power toward the solar panel 10 is prevented and it is possible to prevent the solar panel 10 from discharging.

With respect to the charging apparatus 100 included in the cellular phone K of this embodiment, the regulator 60 is set closer to the battery 30 than the reverse-current blocking diode 70. In other words, it is possible to supply the electric power to the battery 30 without fluctuation or disturbance of the voltage of the electric power.

In the case in which the electric power is supplied from the external power source via the AC adaptor input terminal 40, the electric power from the external power source is regulated to be a predetermined voltage by the external charging circuit 50 and is supplied to the battery 30.

In the case in which, as explained above, the external power source is connected and the electric power from the external power source is supplied to the battery 30 via the external charging circuit 50, and the voltage of the electric power supplied from the external power source is larger than the voltage of the electric power generated by the solar panel 10, the electric power from the solar charging circuit 20 is not supplied to the battery 30.

As described above, the charging apparatus 100 of the cellular phone K of this embodiment includes the external charging circuit 50 which supplies the electric power from the external power source to the battery 20. Therefore, if the electric power from the solar charging circuit 20 is not sufficient to charge the battery 30, it is possible to charge the battery 30 by applying electric power from an external power source.

It should be noted that the output portion 21 of the solar charging circuit 20 is connected closer (or directly) to the battery 30 than the output portion 54 of the external charging circuit 50, therefore, even in the case in which the charging apparatus 100 includes the external charging circuit 50, it is possible to supply the electric power generated by the solar panel 10 more appropriately to the battery 30 without passing through the external charging circuit 50.

The cellular phone K, which is a terminal apparatus, of this embodiment includes the charging apparatus described above; therefore, it is possible to apply the electric power generated by the solar panel 10 efficiently for charging and to charge the battery 30 in a shorter time.

In this embodiment, to reverse-current blocking diode 70 is applied as a control portion for controlling the cent of the electric power flowing in the direction from the battery 30 to the solar panel 10. The present invention is not limited by this, and it is preferable to apply a switching element as the control portion.

For a solar charging circuit with low power consumption, other than the circuit including the operational amplifier described above, it is preferable to apply a circuit including a Zener diode.

In this embodiment, the cellular phone K is described as the terminal apparatus including the charging apparatus 100, however, the present invention is not limited by this and can be applied to all of terminal apparatuses which include a rechargeable battery.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Hereinafter, an example of the embodiment above is described. In this example, as the solar panel 10 of the embodiment above, a solar panel which has a maximum output current when the output voltage is 2.4-4.2 V and which is made from amorphous silicon is applied, and this solar panel 10 is attached on the case or the main body of the cellular phone in an area of 4 cm×7 cm. As the battery 30, a lithium-ion battery which is rechargeable in a range of 2.8-4.2 V is applied.

Figure 5:
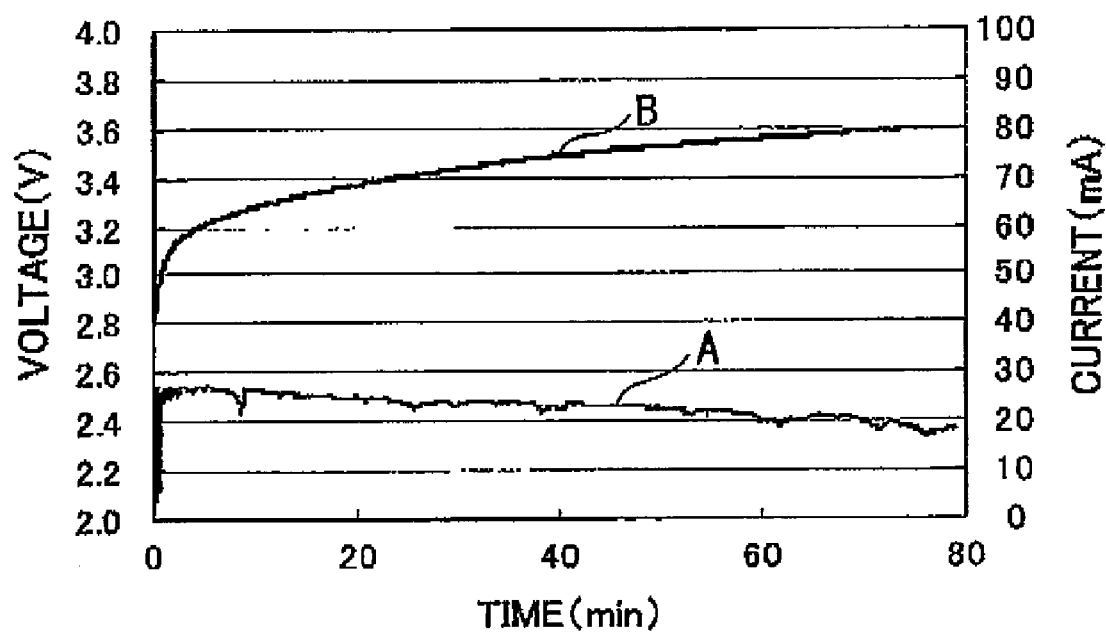
FIG. 5 is a description figure for explaining an embodiment of the present invention.

In the case in which the voltage of the battery 30 is 2.8 V and the solar panel is facing the sun, as shown in graph A of FIG. 5, the output current obtained from the solar panel is approximately 27 mA. In this case, as shown in graph B, the voltage of the battery 30 increases from 2.8 V to 3.6V in approximately 80 minutes; therefore, it is confirmed that the battery is charged in short time.

Figure 6:
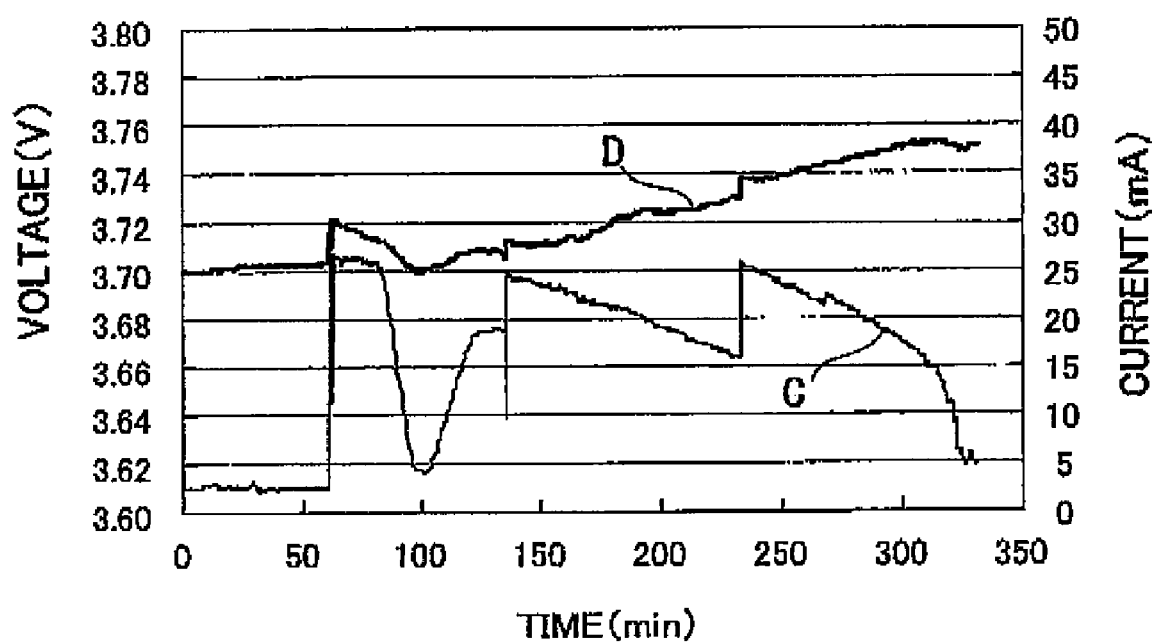
FIG. 6 is a description figure for explaining an embodiment of the present invention.

Even in the case in which, as shown in graph C of FIG. 6, the output current fluctuates because of light irradiation on the solar panel with displacements of illuminance, it is confirmed that, as shown in graph D of FIG. 6, the battery 30 is charged in a short time from a state in which the battery is charged to approximately 50% of full capacity (electric potential of the battery is 3.7 V).

It should be noted that the external charging circuit provided by the charging apparatus of the prior art consumes a current of 12 mA, in contrast, the solar charging circuit provided by the charging apparatus of this example consumes a current of 0.009 mA.

In this example, the solar panel made from amorphous silicon, which has a 5-7% conversion rate and from which approximately a 30 mA output current is obtained per illuminance of 100 kLx, is applied; however, it is preferable to apply a solar panel made from polysilicon which has a 15-18% conversion rate or efficiency and from which approximately 80 mA of output current is obtained per illuminance of 100 kLx. In this case, it is expected that the battery can be charged in even less time.

Otherwise, it is possible to apply a solar panel made from monocrystal silicon, gallium arsenide, cadmium sulfide, or the like.

What is claimed is:

1. A charging apparatus comprising:
   a battery which is rechargeable;
   a photovoltaic generator which generates electric power in response to received light; and a generative charging circuit which supplies electric power generated by the photovoltaic generator to the battery, the generative charging circuit comprising:
- a control portion which controls current in a direction from the battery to the photovoltaic generator; and
- a voltage regulation portion which regulates voltage of electric power supplied from the photovoltaic generator to the battery, which is connected with the control portion in series, such that the control portion connects to the battery via the voltage regulation portion, and in which no transistor for charging is included.

2. The charging apparatus according to claim 1, wherein the voltage regulation portion comprises an operational amplifier.

3. The charging apparatus according to claim 1, wherein the voltage regulation portion is set closer to the battery than the control portion.

4. The charging apparatus according to claim 1, wherein the control portion is a diode element.

5. The charging apparatus according to claim 1, wherein the control portion is a switching element.

6. The charging apparatus according to claim 1, further comprising:
an external charging circuit supplying electric power from an external power source, wherein:
the generative charging circuit comprises an output portion;
the external charging circuit comprises an output portion; and
the output portion of the generative charging circuit is set closer to the battery than the output portion of the external charging circuit.

7. A terminal apparatus comprising:
a main body;
a battery which is rechargeable and which is arranged inside the main body;
a photovoltaic generator which generates electric power in response to received light and which is arranged on a surface portion of the main body; and
a generative charging circuit which supplies electric power generated by the photovoltaic generator to the battery, the generative charging circuit comprising:
a control portion which controls current in a direction from the battery to the photovoltaic generator; and
a voltage regulation portion which regulates voltage of electric power supplied from the photovoltaic generator to the battery, which is connected with the control portion in series, such that the control portion connects to the battery via the voltage regulation portion, and in which no transistor for charging is included.

8. The terminal apparatus according to claim 7, wherein the voltage regulation portion is set closer to the battery than the control portion.

9. The terminal apparatus according to claim 7, further comprising an external charging circuit supplying electric power from an external power source, wherein:
the generative charging circuit comprises an output portion;
the external charging circuit comprises an output portion; and
the output portion of the generative charging circuit is set closer to the battery than the output portion of the external charging circuit.

* * * * *